J. R. MARKLE.
ELECTRIC POWER TRANSMISSION SYSTEM.
APPLICATION FILED MAY 13, 1911.

1,139,882.

Patented May 18, 1915.
4 SHEETS—SHEET 1.

Witnesses:
L. B. Graham
W. Perry Helm

Inventor:
John R. Markle
By James Liddington, Amos Liebold
Attys.

J. R. MARKLE.
ELECTRIC POWER TRANSMISSION SYSTEM.
APPLICATION FILED MAY 13, 1911.

1,139,882.

Patented May 18, 1915.
4 SHEETS—SHEET 2.

J. R. MARKLE.
ELECTRIC POWER TRANSMISSION SYSTEM.
APPLICATION FILED MAY 13, 1911.
1,139,882.
Patented May 18, 1915.
4 SHEETS—SHEET 3.
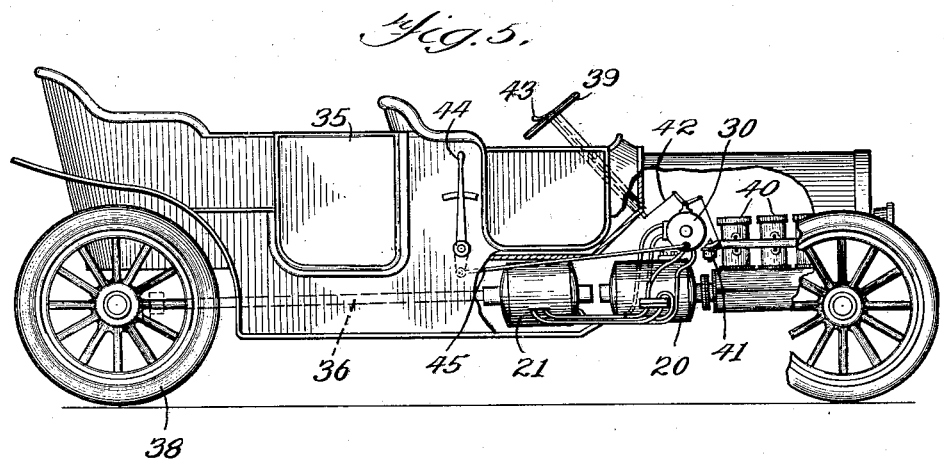
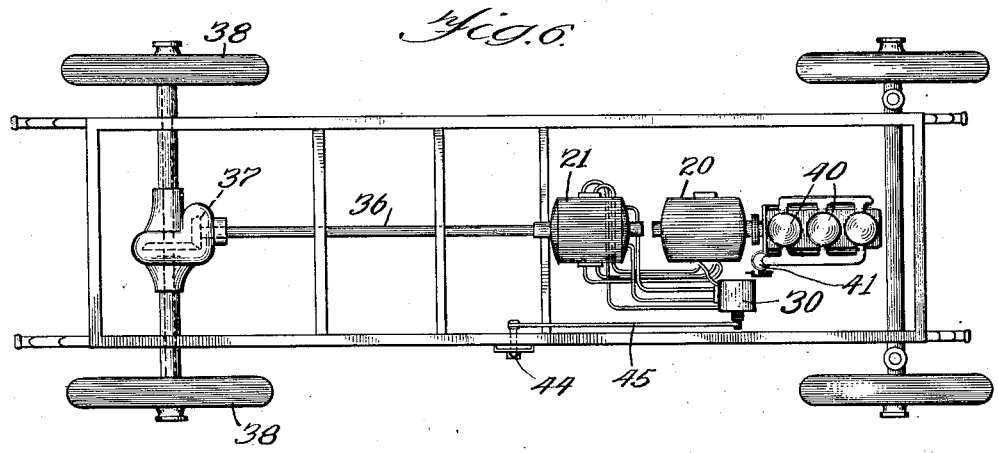

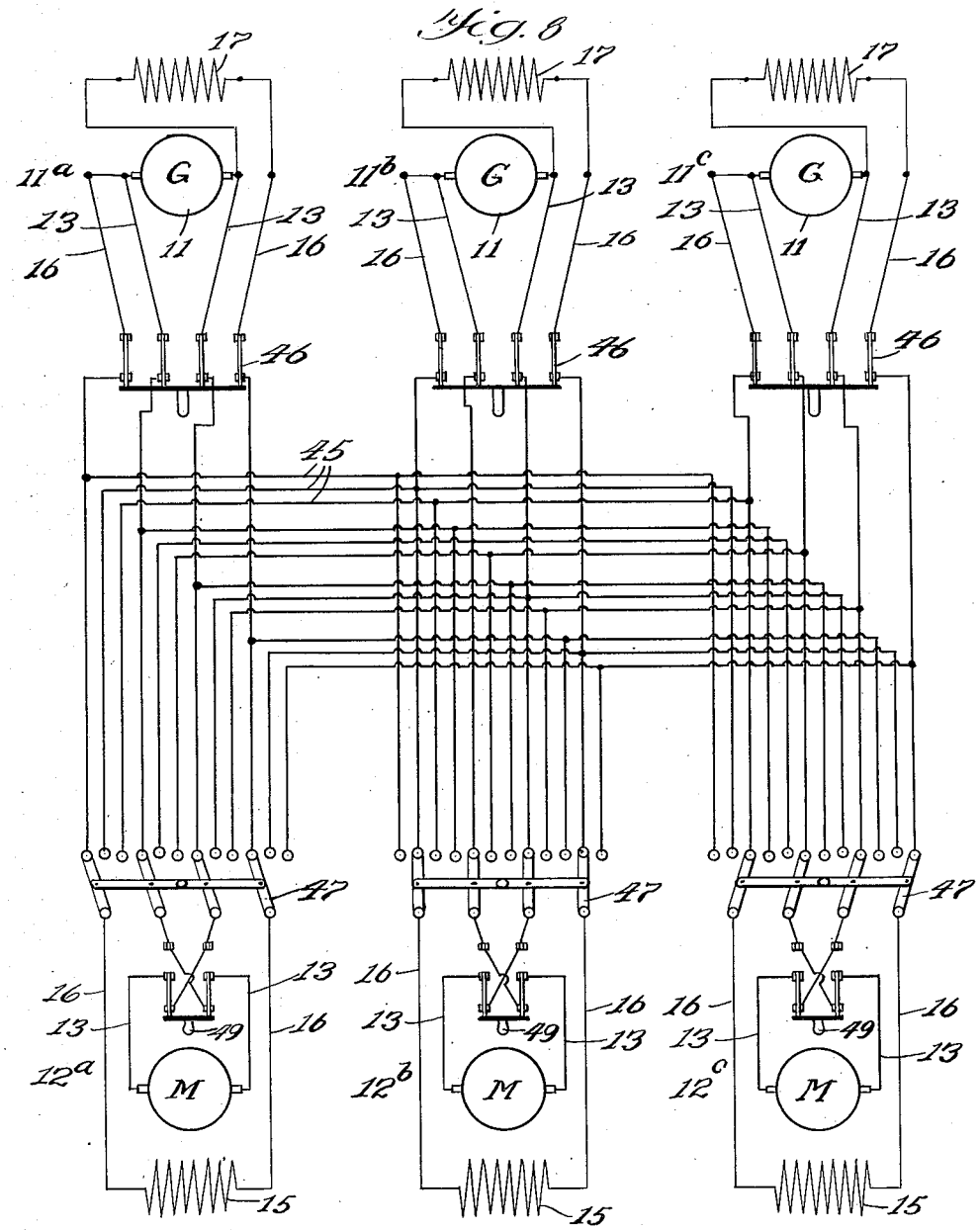

UNITED STATES PATENT OFFICE.

JOHN R. MARKLE, OF CHICAGO, ILLINOIS.

ELECTRIC POWER-TRANSMISSION SYSTEM.

1,139,882.     Specification of Letters Patent.     Patented May 18, 1915.

Application filed May 13, 1911. Serial No. 626,971.

*To all whom it may concern:*

Be it known that I, JOHN R. MARKLE, a citizen of the United States, residing at Chicago, in the county of Cook and State of Illinois, have invented new and useful Improvements in Electric Power-Transmission Systems, of which the following is a full, clear, concise, and exact description, reference being had to the accompanying drawing, forming a part of this specification.

My invention relates to a system of electrical power transmission, particularly adapted to conveyances, such as automobiles, marine craft, railway cars, and the like, although some of the features thereof may be used in other connections and for other purposes. By my invention I am able to produce a system for the electrical translation, transmission and distribution of power which possesses important advantages, hereinafter set forth, over the systems of the prior art.

It is one of the objects of my invention to provide an efficient and simple electrical power transmission system which may be interposed between a prime mover mounted on the conveyance and the propelling means, and in the use of which variation of speed and reversal of direction of movement may be accomplished without the use of clutch mechanism or mechanical reversing gear. By my electrical power transmission system the operator can start, stop or reverse the direction of movement of the conveyance by electrical means of control and can vary the speed by either mechanical or electrical means, or both, as may be preferred.

A further object of my invention is to provide effective means for the transmission of power from a suitable prime mover to a driven part with interposed electrical transmission means and suitably associated regulating means, whereby the starting and stopping and direction of rotation of the driven part, as well as the speed and the torque thereof, may be varied at the will of the operator.

Other objects of my invention will hereinafter more fully be set forth.

For the purpose of disclosing my invention I have illustrated certain embodiments thereof in the accompanying drawings. It will be understood that these drawings illustrate a few only of the embodiments of which my invention is capable.

Figure 1:
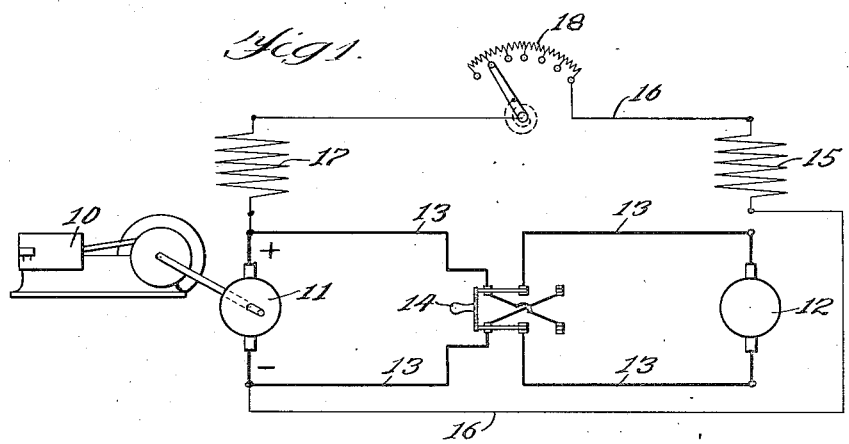
Figure 2:
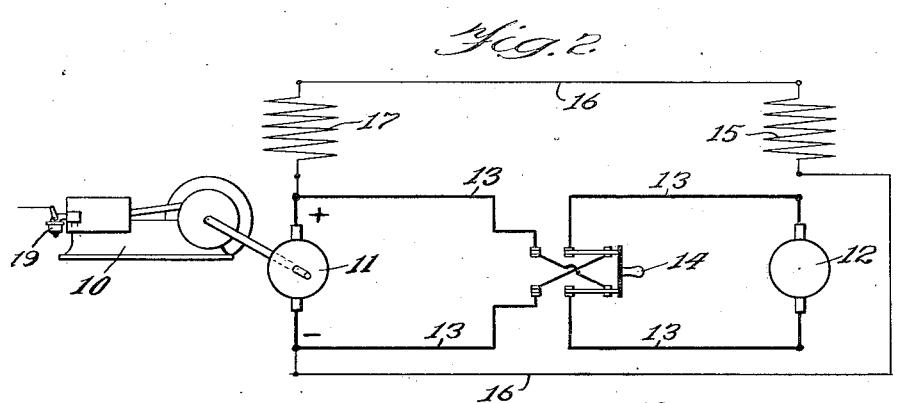
Figure 3:
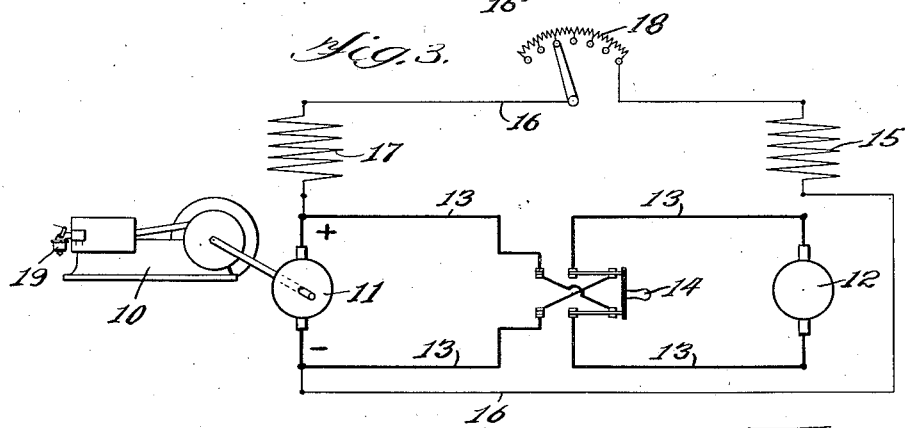
Figure 4:
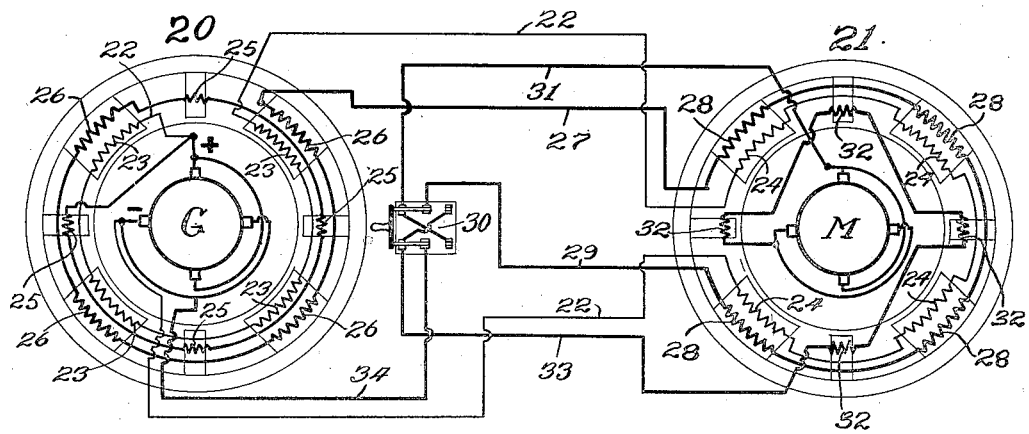
Figure 7:
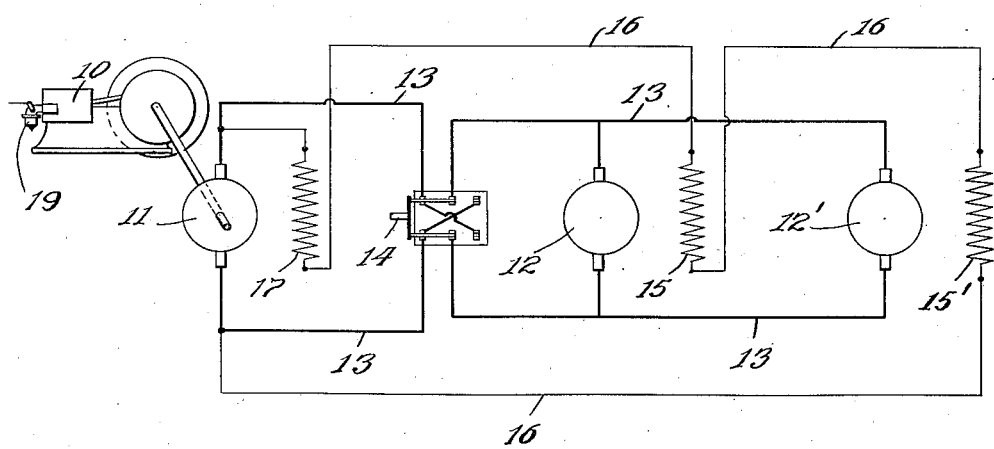

Figure 1 is a simplified diagrammatic view of the system of my invention showing the same in connection with a constant speed prime mover or engine, and with an electrical speed regulator; Fig. 2 is a similar view, but with a variable speed prime mover having a mechanical speed regulator; Fig. 3 is a similar view showing a further modification of the invention, in which the speed may be varied either by a mechanical regulator or by an electrical regulator, or both; Fig. 4 is a diagrammatic view showing another modification of the system; Fig. 5 is a side elevation of an automobile having adapted thereto the system diagrammatically illustrated in Fig. 4; Fig. 6 is a bottom plan view of the automobile illustrated in Fig. 5; Fig. 7 shows my invention applied to the operation of a plurality of driven parts, as in a train of cars or the like; Fig. 8 shows my invention applied to a parallel plan of cross connection.

Referring to Fig. 1, which illustrates diagrammatically in simple form one of the embodiments of which my invention is capable, let 10 indicate the prime mover, which may consist of a gasolene, steam, or other suitable form of engine and which in the arrangement shown may be an engine of the constant speed type having a suitable governor for maintaining the speed constant. 11 indicates a generator armature suitably connected to and driven by the engine, and 12 a motor armature which is supplied with energy from the generator armature 11. The armature of the motor 12 is connected across the armature of the generator by conductors 13, 13 and in the circuit thus formed is interposed circuit controlling and reversing means which may take the form of a switch 14, which for convenience of illustration is shown as an ordinary double throw reversing switch, but which may be a drum switch or of any other preferred form. This switch is designed to control the starting, stopping and direction of rotation of the motor armature.

The field winding 15 of the motor is in the present embodiment (Fig. 1) included in a circuit comprising conductors 16, 16, which are connected across the generator armature, and the circuit thus formed may, as in the particular embodiment illustrated in this figure, also include the field winding 17 of the generator. For the most efficient and satisfactory results in practice, the field windings of the generator and the motor are included in the same circuit, as illustrated. As the prime mover in the arrangement illustrated in Fig. 1 is intended to be a constant speed engine and the generator consequently driven at constant speed, electrical controlling means are provided for varying the speed of the motor. As shown in the arrangement illustrated in Fig. 1, the speed controlling means may take the form of a field rheostat 18 interposed in the circuit including the field windings of the generator and the motor, which circuit may for convenience be termed the main field circuit. This main field circuit constitutes an individual circuit which may be traced from the positive brush of the generator, through the field winding 17 of the generator, conductor 16, rheostat 18, field winding 15 of the motor, and the other conductor 16 to the negative brush of the generator. As clearly appears from the drawings, the motor armature on the one hand and the field windings of the motor and the generator on the other are in individual circuits, and it therefore results that the field of the motor may be continuously excited so long as the prime mover is in operation, irrespective of the condition of the armature circuit of the motor, whether open or closed, and whether current through the armature flows in one direction or the other. This feature of having the field winding of the motor in an individual circuit which is separate from and independent of the armature circuit of the motor and which may be continuously excited during the running of the prime mover, whether the armature circuit is open or closed, is productive of important practical results. Owing to the continuous excitation of the motor field and the consequent continuous field of force which results, the armature circuit may, if desired, be closed by means of an ordinary switch 14 to admit current to the motor armature without the interposition of the commonly employed starting or regulating resistance.

In starting the apparatus the engine 10 will be started and brought to the required speed and will be maintained at that speed through the agency of the usual automatic governing device commonly employed with constant speed engines. The resistance of the field rheostat will, at starting, be all included in circuit, so that as the armature of the generator rotates it will move in a weak field of force. In consequence, the current generated in the generator armature will be correspondingly small. The switch in the motor armature circuit may therefore be closed to admit current to the motor armature. The field of the motor will be correspondingly weak. As the arm of the field rheostat is moved to cut out the resistance step by step, the field of the generator, as well as the field of the motor, will be gradually built up together and the speed of the motor armature and the torque exerted thereby will correspondingly increase. The motor armature may thus be brought gradually to full speed. By manipulating the arm or controlling handle of the field rheostat the speed of rotation of the motor armature may be varied at will during the normal operation thereof. The motor armature may be brought to rest at will without stopping the engine by opening the switch in the armature circuit and may be started again by closing the switch, and the current through the motor armature may be reversed through the agency of the switch to cause such armature to rotate in the opposite direction. If desired, the arm of the rheostat may be provided with a spring, as indicated in dotted lines in Fig. 1, so that when the arm is released by the operator it will be automatically returned to its initial position and thereby reinsert the resistance in the field circuit, thus weakening the field and acting as a throttle valve to the system.

In accordance with my invention, I may dispense with the starting or regulating rheostat commonly employed with electric motors. By linking the armatures and field windings together as described, the generator-motor system becomes a unit in which the several interrelated electro-magnetic elements co-act to permit the starting and stopping and reversal of the motor armature under full or partial load by manipulating the simple circuit opening and reversing switch. The opening of the motor armature circuit leaves the motor field energized in readiness for the quick re-starting of the motor armature upon the re-closing of the motor armature circuit, and this re-starting may be accomplished without the employment of any protective armature resistance, such as has heretofore been usually employed in practice.

Preferred results are secured by having both the generator field and the motor field in the same circuit. By moving the rheostat lever to increase the resistance in the main field circuit the field of the generator will be weakened and the electromotive force developed by the generator correspondingly decreased, thereby developing less torque and decreasing the speed of the motor. If sufficient resistance is inserted in the main field circuit the point will be reached where the torque of the motor will be so reduced in view of the load that the motor will be brought to rest. Conversely, when the resistance in the main field circuit is decreased, the field of the generator will be strengthened and a higher electromotive force will be developed by the generator, the increased power of the generator acting directly upon the armature of the motor to cause the same to develop greater torque and increase in speed.

By placing the generator and motor field windings in the same circuit, one field rheostat may serve for both fields, and, moreover, the building up of the two fields uniformly and in unison is insured. Less current is required to energize the fields and in consequence the fields build up more rapidly. Owing to the inclusion in the main field circuit of the two field windings in series, the field strength is such that the motor armature accelerates quickly, permitting a quicker and safer starting of the motor armature under load. Should the circuit of the motor field winding be broken or opened through accident, a dangerous flow of current through the motor armature is prevented, because the circuit through the generator field winding would likewise be open and the generator field dead, so that the generator could not generate current, and consequent danger of motor armature burn-out is eliminated. By placing the fields of the generator and motor or motors in series the difference of potential across each field is reduced and the liability of breaking down the field insulation or of "burn-outs" is consequently reduced.

Instead of employing a constant speed engine and an electrical controller, as in the arrangement shown in Fig. 1, I may employ as the prime mover for driving the generator an engine having means for varying the speed thereof, so that by varying the speed of such engine, the speed of the generator and motor may be correspondingly varied. Such an arrangement is diagrammatically illustrated in Fig. 2. In this modification the armature circuit and independent main field circuit are designated 13, 13, and 16, 16, respectively. In this instance the field rheostat shown in Fig. 1 is omitted, while the prime mover 10 is provided with any suitable or ordinary means, such as a throttle 19, for varying or regulating the speed thereof. As in the arrangement shown in Fig. 1, the motor field winding may be continuously excited while the prime mover is in operation and the motor may be started, stopped or reversed by movement of the switch 14 in the same manner as described in connection with Fig. 1 and without affecting the continuity of the main field circuit and the consequent continuous excitation of the motor and generator fields. Speed variation or torque regulation of the motor is attained by movement of the throttle valve to increase or decrease the speed of the prime mover or engine. As the speed of the generator will vary as the speed of the engine varies, the power output of the generator will likewise vary, and as the energy to drive the motor is supplied by the generator, it is obvious that by merely increasing or decreasing the speed of the prime mover the speed or torque of the motor may be varied at will.

In starting, the switch 14 may be closed to connect the motor armature in circuit with the generator armature, and then, by means of the throttle, the engine may be gradually started to bring the motor armature to full speed, or such other speed as may be desired. The motor armature may thus be gradually started under normal load without undue strain upon the system. The motor armature may be stopped, if desired, without stopping the engine, by opening the armature switch 14 and may be started again by closing the switch; or, if desired, the direction of rotation of the motor armature may be reversed without stopping the engine by reversing the armature current through the agency of the armature switch 14. If desired, the motor armature may be stopped by stopping the engine or may be reversed by bringing the engine to rest, reversing the switch 14, and then starting the engine again to drive the motor in the opposite direction. The speed of the motor armature may be varied at will by varying the speed of the engine through the agency of the throttle.

In the arrangement illustrated, with the generator and motor field windings in series in the same circuit, the generator and motor fields build up quickly and in unison as the engine is started from rest. By this series arrangement of the fields they build up more rapidly than would be the case were they in separate circuits. The motor armature is thus set in motion and brought to speed under load in the least possible space of time and without the flow of injurious current through the motor armature.

In Fig. 1 I have shown a field rheostat in the main field circuit for varying the speed or torque of the motor, the prime mover being of the constant speed type, while in Fig. 2 such speed and torque variation is brought about by employing a variable speed prime mover. If desired, however, and while still retaining the advantages of my invention, both of these means may be employed for regulating the speed and torque of the motor. Such an arrangement is diagrammatically depicted in Fig. 3. In this modification the prime mover which drives the generator consists of the engine 10, having means, such as the throttle 19, for varying the speed of the same, as in the arrangement shown in Fig. 2. Interposed in the main field circuit 16, as in Fig. 1, is a field rheostat 18. With this arrangement the speed of the motor may be varied by manipulating the rheostat, as pointed out in connection with Fig. 1, or by varying the speed of the prime mover, as described in connection with Fig. 2. Or, if desired, the speed and torque of the motor may be varied by the conjoint manipulation of the mechanical and electrical controllers.

In the various modifications heretofore described, irrespective of the means employed for controlling the action of the motor, the armature of the motor is in one independent circuit supplied with current at varying voltage from the armature of the generator while the field of the motor is in another independent circuit supplied with current from the armature of the generator. Moreover, the field of the motor is energized, so long as the prime mover continues in operation, independently of the current through the armature of the motor, so that the armature circuit may be opened, closed or reversed without objectionably affecting the field excitation of the motor. With this arrangement the current may, as before stated, be admitted to the motor armature without the interposition of any protective starting or regulating resistance. In other words, with my invention rheostatic regulating devices in the armature circuit may be dispensed with and a simple circuit closing or reversing switch may be employed in the armature circuit, so that current through the armature can be cut off to stop the motor or admitted to start the motor, and so that the direction of the current through the armature may be reversed at will to alter the direction of rotation of the motor armature.

In the embodiments of the invention illustrated in Figs. 1, 2 and 3, the only field windings shown are those included in what I have termed the main field circuit. The invention may, however, be embodied in connection with various forms of generators and motors which may be supplied with field windings otherwise connected in circuit and either compounded with respect to the main fields or otherwise. For example, the arrangement may be as illustrated in Fig. 4, which in practice has been found to give ideal results. In this instance the generator 20 and motor 21 are illustrated as of the four pole type, and are provided with commutating poles. For convenience of illustration, the prime mover or engine is omitted, although it is to be understood that the generator 20 is driven by suitable power, as heretofore explained in connection with Figs. 1, 2 and 3.

The main field circuit 22, which corresponds with the circuit 16, in Figs. 1, 2 and 3, may be traced from the positive brush of the generator, through the main field windings 23 of the generator, thence to the motor, through the main field windings 24 of the motor and then to the negative brush of the generator. This main field circuit may have included therein a field rheostat, as in the arrangement shown in Fig. 1, but in the present instance is not provided with such rheostat. In any event, the main field circuit of the motor, as in the arrangements previously described, is an independent circuit by means of which the fields 24 of the motor, and in the present instance the fields 23 of the generator, are continuously excited during the operation of the prime mover independently of the motor armature.

The armature circuit of the motor, which in the embodiment of the invention illustrated in Fig. 4 also includes the compound windings of the generator and motor as well as the commutating pole windings of both machines, may be traced from the positive brush of the generator through the commutating pole windings 25 of the generator, then through the series fields 26 of the generator, then by conductor 27 to and through the series fields 28 of the motor, then by conductor 29 to the armature reversing switch 30. With the reversing switch in the position illustrated in the drawings, the circuit continues by way of conductor 31 to and through the armature of the motor, then through the windings of the commutating poles 32 of the motor to conductor 33 back to the reversing switch 30, and by way of conductor 34 to the negative brush of the generator. With the reversing switch in the position illustrated, the conductors 29 and 33 are connected by suitable contacts with the conductors 31 and 34, respectively. When the switch is in its other extreme position, the conductor 29 is, by means of suitable back connections, connected to the conductor 33 while the conductor 31 is connected to the conductor 34, thereby reversing the direction of current through the motor armature. In the neutral position of the switch the armature circuit is opened. As the switch 30 is located in the armature circuit between the field windings 28 and the motor armature, the reversal of the armature connections does not affect the direction of the current through the fields 28. It will be observed, however, that the commutating pole windings of the motor are connected in circuit between the armature and the reversing switch so that when the armature current is reversed the current through these windings will likewise be reversed, as is required when such commutating poles are employed.

As in the embodiments of the invention illustrated in Figs. 1, 2 and 3, the main field windings of the motor in Fig. 4 are connected to the armature of the generator through the agency of a circuit which is independent of the circuit which supplies current to the armature of the motor, so that the opening of the armature circuit to stop the motor or the reversal of the leads to change the direction of rotation will not affect the excitation of the motor field magnets sufficient for starting, re-starting and reversal purposes. In consequence, as is the case with other arrangements which embody the invention, the fields of the motor are continuously excited, wholly or in part, and when current is admitted to the motor armature, the armature quickly speeds up and a protective counter-electromotive force is developed.

In Figs. 5 and 6 I have shown my invention (specifically the embodiment of the invention illustrated in Fig. 4) as applied to an automobile. While a conveyance of this type is used for purposes of illustration, it is to be understood that this is not intended as a limitation, the automobile being selected merely for purposes of convenience in showing the adaptation of the invention to a conveyance, the electrical power transmission system being equally adapted for use with marine craft, cars, railway trains, trucks, traction engines, elevators, hoists, and other forms of conveyance, and to some extent in connection with transmission systems generally, as heretofore indicated. With this understanding, and referring to Figs. 5 and 6, the numeral 35 indicates an ordinary automobile provided with the usual drive shaft 36, transmission gear 37, driving wheels 38 and steering wheel 39. Mounted in or on the conveyance is the prime mover, which in the present instance is shown as a gasolene engine 40, provided with suitable means for varying the speed thereof, as by means of the throttle 41, which, as is usual with automobiles, is controlled by a connection 42 extending from the throttle to the hand lever 43 on the steering wheel 39. By manipulating the lever 43 the speed of the engine may be varied in the usual manner, or the speed of the engine may be controlled in any other suitable manner. Also mounted in or on the conveyance is the electrical generator 20, shown in Fig. 4, the armature shaft of which is connected to the engine shaft in any suitable manner so that the generator will be driven by the engine. In the illustration, the armature shaft of the generator is connected directly to the engine shaft so as to be driven at the same speed as the engine. This is not material, however, as any suitable connecting or power transmitting means may be employed. The motor 21 is mounted on the conveyance in a convenient position and has its armature connected in any suitable way to the drive shaft 36, and the starting, stopping and reversing switch 30, which is preferably of the drum type, is operated by means of a lever 44 conveniently located with respect to the driver and connected to the switch 30 by connecting rod 45.

In the embodiment of the invention illustrated in Figs. 5 and 6, the specific circuit arrangement of which is shown in Fig. 4, the speed of the conveyance is controlled by varying the speed of the engine by the mechanical controller, while the starting, stopping and reversal of direction of the conveyance are controlled through the medium of the switch or electrical controller 30. Owing to the fact that so long as the prime mover is in operation the main field windings of the motor are continuously excited, the degree of excitation depending merely upon the speed at which the engine is running, the driver or attendant can start under heavy load with adequate torque in the motor by closing the armature circuit through the medium of the switch 30 and then gradually starting the engine; and he can reverse the direction of movement of the conveyance without stopping the engine merely by throwing the switch 30 to reverse the motor armature connections. He may stop the vehicle without stopping the engine by opening the switch 30 and may restart by closing the switch. Moreover, the starting and reversing may be accomplished without the employment of the customary armature starting resistance and without danger to the motor, for the reasons explained.

By the use of my invention the speed may be controlled and the conveyance stopped and started at will without employing speed reducing gearing or clutches of any kind, while at the same time the operator or driver has perfect control over the conveyance. A wide difference between engine speed and motor speed is obtainable by suitably winding the generator and motor. Thus the generator may be designed to run at a high normal speed while the motor may be designed to run at a low normal speed, or vice versa. The speed may be stepped up or stepped down from the generator, as may be desired, to meet the particular conditions at hand. Any desired speed ratios between generator and motor are thus possible. A high speed engine may be coupled with a low speed driven part, or vice versa.

It will be obvious that in the use of my invention a single generator may be coupled with a plurality of motors, as when the invention is used in connection with a train of cars. Under such conditions, the motors may be connected with the generator in any preferred manner, as by arranging the armatures of the motors in parallel across the generator armature while the fields of the motors are, for example, connected in series in the main field circuit. Such an arrangement, which is merely illustrative of one way of connecting a plurality of motors with a single generator in embodying my invention, is shown in Fig. 7, where 10 indicates a variable speed engine, 11 the generator, and 12, 12' a plurality of motors, the armatures of the motors being connected in parallel across the armature of the generator while the fields of the motors are connected in series in the main field circuit. The prime mover, generator, and starting, stopping and reversing switch would preferably be located in the pilot car, and each car of the train provided with a motor connected to the driving gear thereof. With this arrangement all of the motors can be controlled simultaneously for speed regulation as well as in starting, stopping or reversing.

The employment of a single generator with a plurality of motors, as depicted in Fig. 7, may also be used with advantage for the propulsion of multiple propeller water conveyances, each propeller being driven by its own motor, although in large water craft it would be preferable to have a separate engine and transmission system for each propeller so that each propeller could be operated independently. It will also be obvious that a plurality of separate generator-motor units may be so interrelated that it will be possible to connect any one of the generators with one or more of the motors, or to connect all the generators with any one of the motors. Such an arrangement would be found desirable, for instance, in the propulsion of water craft, when, as above suggested, it was preferred to have a separate engine and transmission system for each propeller. A suitable arrangement for such purpose is illustrated in Fig. 8, in which figure each of the generator elements 11ª, 11ᵇ, 11ᶜ, may be assumed to be driven by an associated prime mover, which for convenience of illustration is not shown, and adapted to supply current to a plurality of motor elements 12ª, 12ᵇ, 12ᶜ. In the particular circuit selected for purposes of illustration, the generator element 11ª and motor element 12ª may be regarded as one unit, the generator element 11ᵇ and motor element 12ᵇ another unit, and the generator element 11ᶜ and motor element 12ᶜ a third unit.

Suitable connection is made between each of the generators and bus bars 45, to which bus bars the armature and field winding circuits of the motors are likewise connected. Interposed in the connections leading from each generator to the associated bus bars is a switch 46, while a switch 47 is likewise interposed between each motor and the bus bars. When the switches are in the position illustrated in the drawing each generator is connected to its own motor. If for any reason it is desired to drive all the motors from one generator, as, for example, the generator 11ª, the switches 46 of the generators 11ᵇ and 11ᶜ are opened, and the switches 47 of the motors 12ᵇ and 12ᶜ are thrown to the extreme left position, thereby connecting the three motors to the bus bars, to which the connections leading from the generator 11ª are connected, in this instance the 1st, 4th, 7th and 10th bus bars. The three motors will then be in parallel with the armature of each connected across the armature of the generator and its field in series with the field of such generator. Likewise, by suitable manipulation of the switches 46 and 47 any generator may be connected to any one or all of the motors. If, for example, the generator 11ª or its prime mover should break down, the generator 11ᵇ may be connected to the motors 12ª and 12ᵇ while the generator 11ᶜ continues to operate its associated motor 12ᶜ. Various other combinations of the generators may be effected by manipulating the switches 46 and 47. In any such combinations the armature of each motor would still be connected across the armature of the generator driving the same while its field winding would be connected in a circuit independent of the armature circuit. In order to reverse the motors a reversing switch 49 is connected in the armature circuit of each motor between the armature and the associated switch 47.

It is apparent from the foregoing description of various embodiments of my invention—which, of course, are a part only of the possible embodiments—that all the field windings of the motor need not be in the individual field circuit which is independent of the current supplied to the motor armature. A part of the motor field windings may be in series with the motor armature, as in Fig. 4, or a part may be otherwise disposed where the same may or may not be partly or wholly dependent upon, or affected by, the motor armature current. But I contemplate having either all or at least a part of the motor field winding supplied with current by means of an individual circuit, so that the circuit through the motor armature may be opened, closed or reversed without affecting the continuous excitation of the motor field to full extent or to such extent as may be necessary or desirable for practicable starting, re-starting and reversing purposes, as heretofore explained.

It will be noted that through the agency of my invention a starting or regulating resistance in the motor armature circuit may be dispensed with. Such a starting or regulating resistance may, of course, be employed if desired, but it is unnecessary and may be wholly omitted. The only switching means employed in the motor armature circuit is the switch for opening and closing the circuit for starting and stopping, and preferably the reversal in the direction of rotation is accomplished through the agency of switching means in the armature circuit, although the reversal in the direction of rotation may be otherwise accomplished if preferred.

When, as in Fig. 2, the variation in speed is accomplished through the agency of a mechanical controller or throttle in connection with the engine, rheostatic controlling devices of all kinds may be dispensed with. When, as in Fig. 1, a constant speed engine is employed, a rheostatic controller may be desirable for controlling the field strength, but even in this case no rheostatic controller in the armature circuit is necessary. By including the field winding of the generator and the field winding of the motor in the same circuit, one field controller is sufficient for the control of both fields.

The system of my invention is markedly efficient. No rheostatic resistance is used in the armature circuit, therefore there are no dead losses due to the same. All power units required can be operated at practically maximum efficiency for any given power required. For example, if only small power is required, it will not be necessary to run the engine and generator at a high speed, thereby including unnecessary losses due to friction, windage, and inherent losses in the generator, but the complete engine-generator-motor unit (Fig. 2) can be run at such slow speed as may be required to give the power desired, with higher efficiency and increased life. Any number of examples will suggest themselves to those skilled in the art whereby by the use of my invention the speed of the apparatus may be lowered for low power or raised for high power, as may be required.

The system of my invention affords an extremely flexible method of control. Almost any reduction in speed from the engine to the motor and thereby to the driving shaft can be obtained, also an infinite number of steps in speed can be secured by either changing the speed of the engine (Fig. 2) or by varying the field strength (Fig. 1), or through the agency of both these regulating means (Fig. 3), or otherwise. A large variety of steps in speed variation may thus be secured through the agency of my invention, while retaining a high degree of efficiency, together with extreme simplicity.

The cost of operation of my system is less than other systems in common use, on account of the absence of rheostatic controllers and the great differentiation of generator and motor speeds obtainable. This reduction in cost involves not only the less initial cost of the equipment, but no repairs are necessary in the rheostatic controller and there is no loss of power in the armature circuit due to the rheostatic type of controller as commonly employed.

The weight of the installation is less on account of the fact that more efficient design of the generator-motor system is possible and there is no rheostatic regulator in the armature circuit (Figs. 1, 2 and 3) or in the field circuit in the structure of Fig. 2, and in consequence the weight of the power units can be less than in common practice, on account of the special, highly efficient methods of applying the power developed. The field rheostat employed in connection with the structures of Figs. 1 and 2 is small and inexpensive as compared with the armature rheostatic controller commonly employed in connection with electric generators and motors. In the structure of Fig. 2, however, all rheostatic controllers, whether of the armature or the field type, are dispensed with and the electrical circuit controlling mechanism is reduced to the simplest possible form, to wit, a circuit opening and reversing switch, with which no loss factor obtains.

The durability of my system is greater on account of the absence of the rheostatic controller, which is one of the most troublesome links in former systems, and also on account of the uniform and gradual manner in which the power may be applied, thus preventing any sudden shock or jar to the power units themselves and to the parts of the driven structure and mechanisms.

Where, in the appended claims, I refer to the motor "field winding" or "field windings" in the independent circuit, it will be understood that I use the word inclusively, as contemplating such field winding so connected either used as the sole field winding of the motor or as but part of the total field winding of the motor, the other part or parts being otherwise and suitably connected in circuit.

Having thus described my invention, what I claim as new and desire to secure by Letters Patent of the United States, is:—

1. A system of the class described, comprising a conveyance having propelling means; a prime mover, a generator driven thereby and a motor having connection with the propelling means, all mounted on the conveyance and constituting a self-contained power driving unit therefor; the generator and motor having their fields and armatures interconnected to enable the generator simultaneously and independently to energize its own field and the field of the motor in advance of the energization of the motor armature; and a switching mechanism for abruptly closing and opening the motor armature circuit from said generator independently of the motor field to start and stop the motor.

2. A system of the class described, comprising a conveyance having propelling means; a prime mover, a generator driven thereby and a motor having connection with the propelling means, all mounted on the conveyance and constituting a self-contained power driving unit therefor; the generator and motor having their fields and armatures interdependently connected by two independent branch circuits, one containing the armature of the motor and the other the motor field winding; and switching mechanism for abruptly closing and opening the armature branch circuit independently of the branch containing the said motor field winding, for starting and stopping the motor.

3. A system of the class described, comprising a conveyance having propelling means; a prime mover, a generator driven thereby and a motor having connection with the propelling means, all mounted on the conveyance and constituting a self-contained power driving unit therefor; the generator and motor having their fields and armatures interconnected by two independent branch circuits, one of which includes a motor field winding and the other the motor armature; and circuit closing and reversing switch mechanism of the armature branch circuit for abruptly closing and reversing the same to start, stop and reverse the motor.

4. A system of the class described, comprising a conveyance having propelling means; a prime mover, a generator driven thereby and a motor having connection with the propelling means, all mounted on the conveyance and constituting a self-contained power driving unit therefor; the generator and motor having their fields and armatures interconnected by two independent branch circuits, one of which includes the motor field winding and the other the armature of the motor; and means for varying the output of the generator to vary the speed and torque of the motor.

5. In a system of the class described, a conveyance having propelling means, a prime mover, a generator driven thereby, a motor connected to the propelling means, and two independent circuits connecting the motor to the generator armature, one of which includes a motor field winding and a generator field winding in series and the other the armature of the motor, and means for varying the output of the generator to vary the speed or torque of the motor.

6. In a system of the class described, a conveyance having propelling means, a variable speed prime mover and a generator driven thereby, a motor connected to the propelling means, two independent branch circuits connecting the motor to the generator armature, one of which contains the motor armature and the other a motor field winding and a generator field winding, and switching means for opening or closing the armature circuit and for reversing the direction of rotation of the said armature.

7. In a system of the class described, a conveyance having propelling means, a prime mover and a generator driven thereby, a motor connected to the propelling means, independent branch circuits connecting the motor to the generator armature, one containing a motor field winding and a generator field winding and the other containing a motor armature, a motor field winding and a generator field winding, means for controlling the output of the generator to vary the speed and torque of the motor, and means for controlling the starting, stopping and reversing of the motor.

8. In a system of the class described, a conveyance having propelling means, a prime mover and a generator driven thereby, a motor connected to the propelling means, independent branch circuits connecting the motor to the generator armature, one containing a motor field winding and a generator field winding and the other containing the motor armature, a motor field winding and a generator field winding, means for controlling the speed of the prime mover to vary the output of the generator and thereby control the speed and torque of the motor, and circuit closing and reversing switching means associated with the motor.

9. A combined generator motor system, comprising a generator field and armature and two independent external circuits leading from the generator field and armature to the motor, one of said circuits containing a motor armature and the other a motor field winding, means to permit the initial energization of the field windings of the generator and motor, and means for subsequently abruptly closing the motor armature circuit in either direction and for opening the same for starting, stopping or reversing the motor.

10. A system of the class described comprising a conveyance having propelling means, a prime-mover, a generator driven thereby and a motor having connection with the propelling means, all mounted on the conveyance and constituting a self-contained power producing and driving unit therefor, two independent external circuits interconnecting the generator armature with the motor, one of said circuits containing the motor armature and the other a motor field winding and a generator field winding, and switching means in the motor armature circuit for opening and closing the same to stop and start the motor.

11. A system of the class described comprising a conveyance having propelling means, a prime-mover, a generator driven thereby, and a motor having connection with the propelling means, all mounted on the conveyance and constituting a self-contained power producing and driving unit therefor, two independent external circuits connecting the generator armature with the motor, one of said circuits containing the motor armature and the other a motor field winding and a generator field winding, and means for opening and closing the armature circuit and reversing the direction of rotation of the motor armature.

12. A power transmission system comprising a prime mover and means for controlling and regulating the speed of the same, a generator driven by the prime mover, a motor, and two independent circuits connected with the generator armature, one containing the motor armature and the other field windings of the generator and the motor.

13. A combined generator-motor system comprising a prime mover and means for varying the speed of the same, a generator driven by the prime mover, a motor, and two independent circuits connected with the generator armature, one containing the motor armature and the other field windings of the generator and motor, and means for reversing the direction of rotation of the motor armature.

14. A combined generator-motor system comprising a prime mover and means for varying the speed of the same, a generator driven by the prime mover, a motor, said generator and motor having compound field windings, and two independent circuits connected across the generator armature, one containing field windings of both machines and the other the armature of the motor and field windings of both machines, and switching means in the said armature circuit of the motor for opening, closing and reversing the same.

15. A combined generator-motor system comprising a variable speed prime mover, a generator driven thereby, a motor, said generator and motor having compound field windings and commutating pole windings, and two independent circuits connected across the generator armature, one circuit containing field windings of both machines and the other circuit containing field windings of both machines, the commutating pole windings and the motor armature, and switching means in the said armature circuit of the motor for opening, closing and reversing the same.

16. A system of the class described comprising a conveyance having propelling means, a correlated initial source of electric energy and a motor, the said motor having connection with the propelling means and all mounted on the conveyance and constituting a self-contained power producing and driving unit therefor, the motor having its armature and a field winding independently excited from said initial source of current, said armature and field winding being in independent branch circuits, the field branch circuit of the motor containing also a field winding of the initial current source, means for varying the energy impressed on said armature and field winding from said source, and means for opening and closing the armature circuit independently of the field circuit to stop and start the motor.

17. A system of the class described comprising a conveyance having propelling means, a correlated initial source of electric energy and a motor, the motor having connection with the propelling means and all mounted on the conveyance and constituting a self-contained power producing and driving unit therefor, the motor having its armature and field winding independently excited from said initial source of current, said armature and field winding being in independent branch circuits, the field branch circuit of the motor containing also a field winding of the initial current source, means for varying the energy impressed on the said armature and field winding, and means for opening and closing and reversing the armature circuit independently of and without affecting the field circuit to stop, start and reverse the motor.

18. A system of the class described, comprising a conveyance having propelling means, a correlated initial source of electrical energy and a motor, the said motor having connection with the propelling means and all mounted on the conveyance and constituting a self-contained power producing and driving unit therefor, the motor having a field winding connected in a closed circuit with the said source of energy whereby the said field winding is continuously excited during the generation of the energy by said source, said closed circuit including a field winding of said initial current source, the armature of the motor being connected in a circuit from said source which is independent of the said field circuit, means for varying the output of the source of energy, and switching means for opening and closing the independent armature circuit to start and stop the motor.

19. A system of the class described, comprising a conveyance having propelling means, a correlated initial source of electrical energy and a motor, the motor having connection with the propelling means and all mounted on the conveyance and constituting a self-contained power producing and driving unit therefor, the motor having a field winding connected to said source of energy and continuously excited thereby, the said connection containing a field winding of the initial current source, a circuit independent of the field circuit and including the armature of the motor, means for varying the output of said source of energy to vary the excitation of the said armature and field, and switching means to open and close and reverse the armature circuit without affecting the field circuit to stop, start and reverse the motor.

20. A system of the class described, comprising a conveyance having propelling means, a correlated initial source of electrical energy and a motor, the motor having connection with the propelling means and all mounted on the conveyance and constituting a self-contained power producing and driving unit therefor, a pair of independent branch circuits extending from said source of electricity to said motor, the motor armature being in one of said branches and the motor field winding and a generator field winding in the other of said branches, means for varying the voltage of current from said source that is impressed upon said circuits to thereby vary the speed or torque of said motor, and switching means for opening and closing the branch circuit containing the armature without deënergization of the motor field winding to start and stop the motor.

21. A system of the class described, comprising a conveyance having propelling means, a correlated initial source of electrical energy and a motor, the motor having connection with the propelling means and all mounted on the conveyance and constituting a self-contained power producing and driving unit therefor, a pair of independent branch circuits extending from said source, the armature of the motor being in one of said branches and a field winding of said motor and of said generator in the other of said branches, means for varying the voltage of current from said source to vary the speed or torque of said motor, and switching means for opening and closing the armature circuit and for reversing the direction of current therethrough to start, stop and reverse the motor.

22. The herein described method of furnishing power for propulsion purposes which consists in rotating an electromagnetic member in a field of force to produce an electric current, delivering a divisible part of said current to produce said field of force and directly to energize a relatively stationary electromagnetic member, delivering a divisible part thereof directly to energize a relatively rotary electromagnetic member in the magnetic field of said stationary member, and varying the voltage of the current generated in said first-mentioned electromagnetic member to thereby vary the speed and torque of said last-mentioned rotary member.

23. The herein described method of operating a power driving unit for conveyances, consisting of prime-mover, generator and motor, which consists in mechanically operating the generator from the prime-mover to generate an electric current, delivering a part of said current to constantly energize the relatively stationary electromagnetic members of both generator and motor, delivering a part of said current to abruptly energize and cause the rotation in the desired direction of the rotary electrodynamic member of the motor, and controlling at will the speed of the prime-mover to control the speed and torque of the motor.

24. A system of the class described comprising a conveyance having propelling means; a prime-mover, a generator driven thereby and a motor having connection with the propelling means, all mounted on the conveyance and constituting a self-contained power driving unit therefor; the generator and motor having their fields and armatures interconnected to enable the generator simultaneously and independently to energize its own field and the field of the motor in advance of the energization of the motor armature; and a switching mechanism for closing and opening the motor armature circuit from said generator independently of the motor field to start and stop the motor.

25. A system of the class described, comprising a conveyance having propelling means; a prime-mover, a generator driven thereby and a motor having connection with the propelling means, all mounted on the conveyance and constituting a self-contained power driving unit therefor; the generator and motor having their fields and armatures interconnected to enable the generator simultaneously and independently to energize its own field and the field of the motor in advance of the energization of the motor armature; and circuit closing and reversing switch mechanism in the armature circuit of the motor for closing and reversing the same to start, stop and reverse the motor.

26. A system of the class described comprising a conveyance having propelling means; a prime-mover, a generator driven thereby and a motor having connection with the propelling means, all mounted on the conveyance and constituting a self-contained power driving unit therefor; the generator and motor having the fields and armatures interconnected to enable the generator to energize its own field and the field and armature of the motor; and means for varying the output of the generator to vary the speed and torque of the motor.

27. A combined generator motor system comprising a generator field and armature and two independent external circuits leading from the generator field and armature to the motor, one of said circuits containing a motor armature and the other a motor field winding, means to permit the initial energization of the field windings of the generator and motor, and means for subsequently closing the motor armature circuit in either direction and for opening the same for starting, stopping or reversing the motor.

In witness whereof, I have hereunto subscribed my name in the presence of two witnesses.

JOHN R. MARKLE.

Witnesses:
MABEL REYNOLDS,
W. PERRY HALM.